United States Patent [19]

Schwaar et al.

[11] 4,012,172

[45] Mar. 15, 1977

[54] LOW NOISE BLADES FOR AXIAL FLOW COMPRESSORS

[75] Inventors: Pierre G. Schwaar, Monroe; John A. O'Connor, Orange, both of Conn.

[73] Assignee: Avco Corporation, Stratford, Conn.

[22] Filed: Sept. 10, 1975

[21] Appl. No.: 612,220

[52] U.S. Cl. .......................... 416/228; 416/223 A
[51] Int. Cl.² ..................................... F04D 29/38
[58] Field of Search ............ 415/181, 119, DIG. 1, 415/79; 416/228, 223

[56] References Cited

UNITED STATES PATENTS

| | | | |
|---|---|---|---|
| 2,160,467 | 5/1939 | Ward | 416/228 |
| 2,359,466 | 10/1944 | Currie | 416/202 |
| 2,663,493 | 12/1953 | Keast | 416/228 |
| 2,839,239 | 6/1958 | Stalker | 415/181 |
| 2,841,325 | 7/1958 | Weise | 415/181 X |
| 3,347,520 | 10/1967 | Owczarek | 416/228 |
| 3,467,197 | 9/1969 | Spivey et al. | 416/228 |
| 3,972,646 | 8/1976 | Brown et al. | 416/228 |

FOREIGN PATENTS OR APPLICATIONS

| | | | |
|---|---|---|---|
| 1,566 | 4/1926 | Australia | 416/228 |
| 378,677 | 7/1923 | Germany | 416/223 |
| 647,053 | 6/1937 | Germany | 416/223 |
| 1,903,642 | 8/1970 | Germany | 416/223 |
| 119,463 | 5/1919 | United Kingdom | 416/228 |
| 1,369,229 | 10/1974 | United Kingdom | 416/228 |

*Primary Examiner*—Everette A. Powell, Jr.
*Attorney, Agent, or Firm*—Irwin P. Garfinkle; Edmund S. Lee

[57] ABSTRACT

A rotor blade configuration is disclosed which greatly reduces noise generated by the low pressure compressor, or fan, of a turbofan engine. The leading edge of the blade is swept forwardly from its hub up to a point of sweep reversal and then swept rearwardly to the tip of the blade. The slope of the curved leading edge line relative to the direction of airflow is gradually decreased from the hub to the tip to maintain the velocity component, of air relative to the blade leading edge, subsonic, while the relative velocity of the air to the blade is above a critical value and supersonic. This substantially eliminates noise producing, standing shock waves along the blade leading edges. Also described are methods for determining the configuration of such blades to obtain these ends with a minimum increase in blade weight and a minimum blade bending and blade attachment stresses.

1 Claim, 8 Drawing Figures

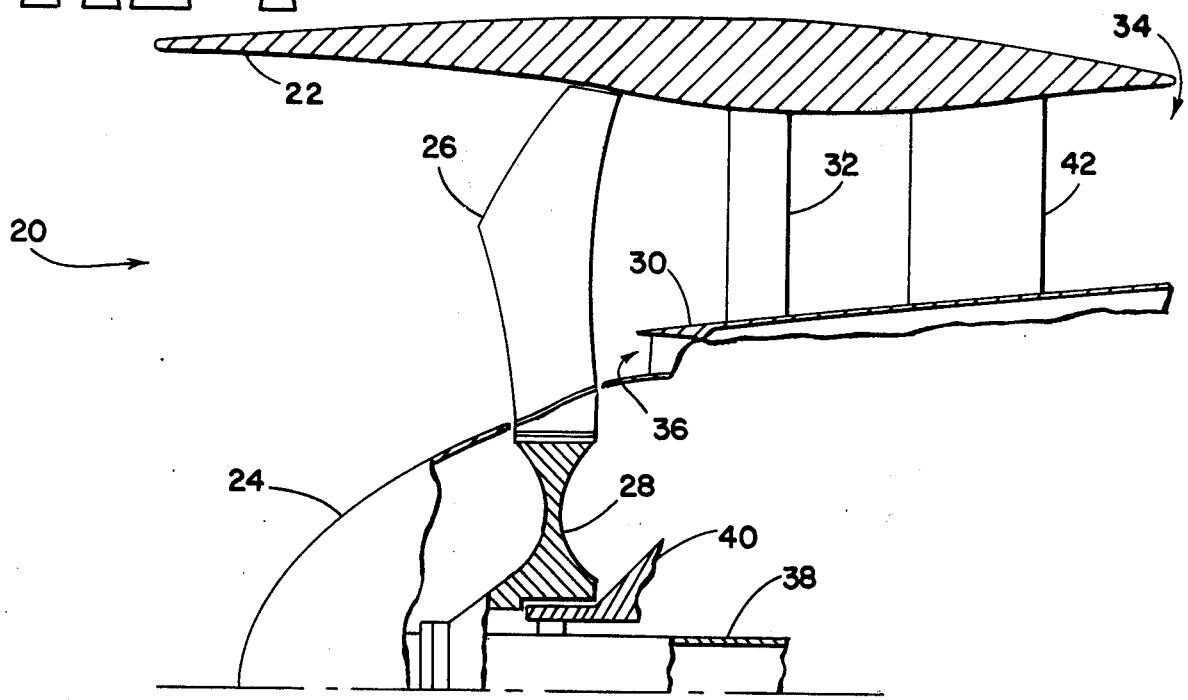
FIG 1
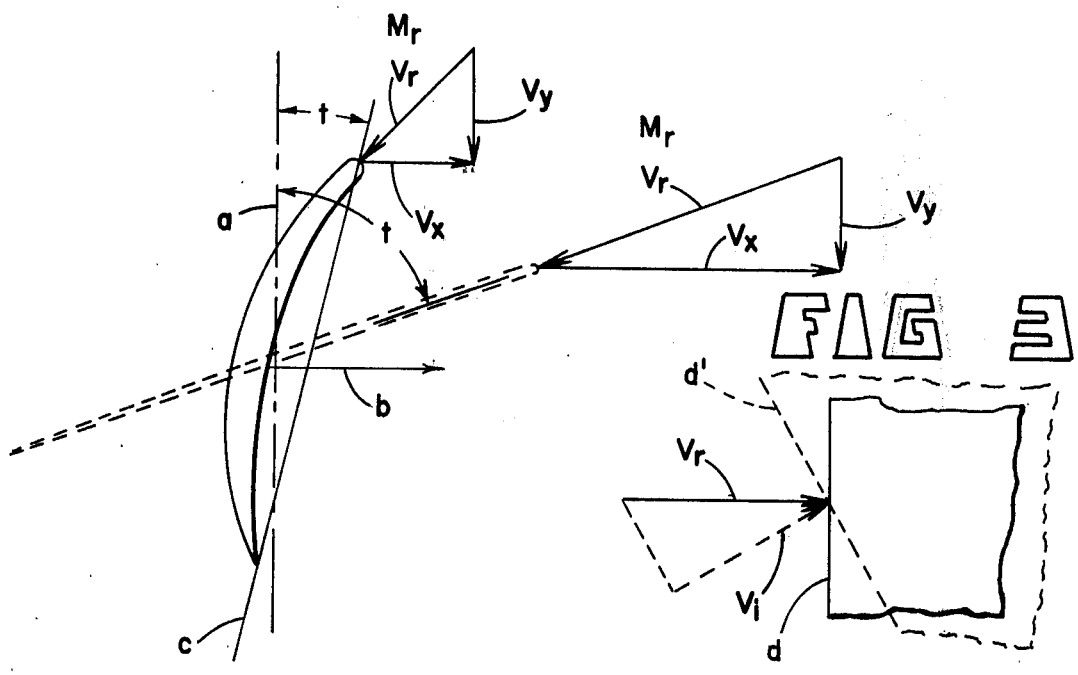
FIG 2
FIG 3

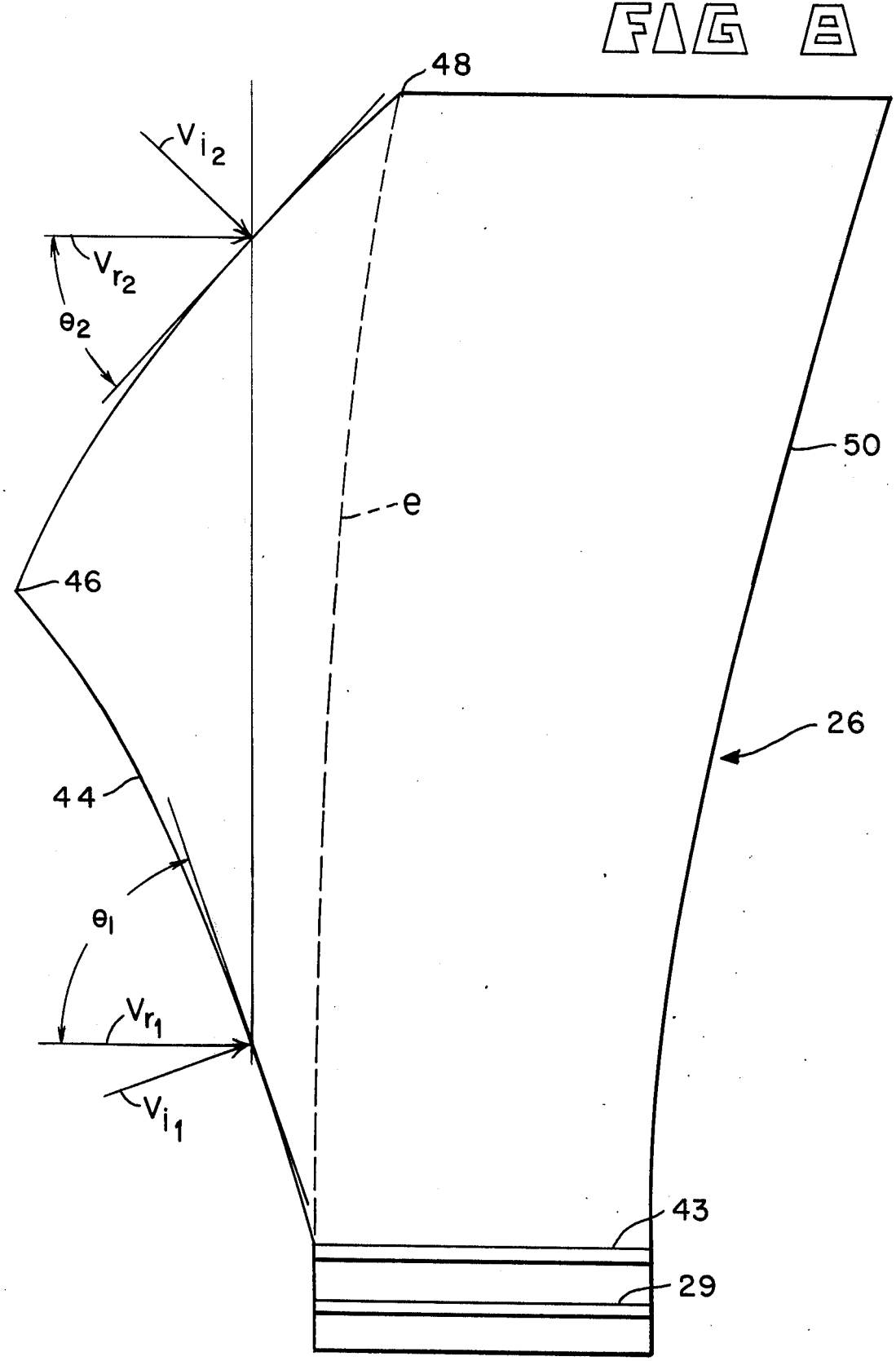

LOW NOISE BLADES FOR AXIAL FLOW COMPRESSORS

The present invention relates to improvements in axial flow compressors, and particularly to noise abatement in low pressure compressors, known as fans, employed in the propulsion of aircraft.

Aircraft flight speeds have increased progressively with the advent of gas turbine propulsion systems. In early systems, the hot gas stream generated by such engines was discharged through a nozzle to provide the propulsive force. Later turbofan engines were developed which provided quieter operation and greater efficiency at high subsonic flight speeds. In a turbofan propulsion system, a portion of the gas stream energy is extracted to drive a low pressure compressor, commonly referenced as a fan, which pressurizes an annular air stream outwardly of the hot gas stream. This air stream, which bypasses the engine proper, is also discharged through a nozzle to supplement the propulsive force of the hot gas stream. Originally the ratio of bypass air to hot gas stream flow was relatively low, in the order of one to one. Such engines have now been superseded, for many applications, by engines with bypass ratios in the order of five to one and upwards to provide even greater efficiency.

Gas turbine engines inherently generate objectionable noise in discharging the hot gas stream through a propulsion nozzle. The introduction of turbofan engines was beneficial from a noise standpoint because of the reduction of the proportionate energy level of the hot gas stream discharged through a propulsion nozzle.

However, turbofan engines, and high bypass ratio engines in particular, created a new and different type of noise problem. In such engines the relative air flow velocity past the upper portion of the rotating fan blades is supersonic. This produces shock waves, along the leading edges of the fan blades, which generate objectionable, forward propagating noise referred to as "multiple pure tone noise." This noise frequently becomes an important part of the overall engine noise.

Shock waves may also be generated locally on the blade surface when the relative air flow velocity exceeds a critical, subsonic value. These shock waves do not generate the referenced "multiple pure tone" noise but are objectionable in that they cause undesirable energy losses. Critical velocity is a function of the sharpness of the leading edge and camber of the blade and other factors affecting local flow conditions. Generally, the Mach number of the critical velocity will range from 0.8 to slightly below 1.0.

It has previously been recognized that the generation of shock waves can be prevented by angling the leading edge of a fan compressor blade, or other airfoil relative to the direction of air flow. This is evidenced by the swept wings of high subsonic and supersonic flight speed aircraft and in specific reference to compressor blades by U.S. Pat. No. 2,633,493, granted to K. H. Keast. In both cases the swept leading edge causes the velocity component normal to the leading edge of the blade to be reduced and, dependent upon the slope of the leading edge relative to the direction of the airflow, such velocity component may be maintained below the critical velocity, or subsonic.

These teachings are not applicable, in a practical sense, to eliminating the generation of shock waves on the blades of high bypass ratio fans. This is due to the high supersonic peripheral tip speeds needed to maintain high work input capacity at the hub section of the high tip-to-hub ratio rotors used in such fans. When these factors are taken into account, simply sweeping the leading edges of such blades, in the fashion done in the past, results in a blade which is either excessively heavy and/or subject to excessive stresses. Thus, while the known principle of sweeping the leading edges of compressor or fan blades is applicable to eliminating forward propagating, standing shock waves and the objectionable noise generated thereby, present teachings do not provide a fan blade practical for incorporation in advanced turbofan engines.

The principal object of the present invention is to reduce the noise generated by shock waves along the leading edges of axial flow compressor blades, particularly in low pressure compressors, known as fans, employed in high bypass ratio turbofan engines.

Another object of the present invention is to minimize, if not eliminate, energy losses due to the generation of localized shock waves where the relative flow velocity exceeds a critical value.

Another object of the present invention is to attain such ends with an improved, structurally sound blade having a minimum weight increase over a conventional blade.

Yet another object of the present invention is to provide improved methods for establishing the configuration of a compressor blade which fulfills the above ends.

These ends are obtained in an axial flow compressor comprising a rotor having a circumferential row of radial blades. Each blade is in the form of an airfoil having varying camber and setting angles from its hub end to its tip end.

The rate of rotation of the rotor, at a design speed, causes the relative velocity of air flow past at least a portion of the blade to exceed a sonic value above which shock waves could be generated along the leading edge of the blade if it were normal to the air flow direction.

In accordance with the invention, the leading edge, at least outwardly from the point where the relative velocity reaches the sonic value, is swept forwardly on a curve having a progressively decreasing slope relative to the direction of air flow. The forwardly swept curve continues to a point located inwardly from the tip end of the blade. From this point the leading edge of the blade is swept rearwardly to the tip end of the blade along a curve also having a progressively decreasing slope relative to the direction of air flow. The slope angle, at all points along said curved leading edge, is such that the velocity component of the incident air flow normal to the leading edge is maintained below the sonic velocity.

Preferably, the trailing edge of the blade is smoothly curved from its hub end to its tip end. Other preferred features are found in having conventional hub and tip end profiles and in having the blade profiles stacked so that the sum of the bending moments produced by the centrifugal and the aerodynamic blade forces is minimized.

The improved method of the invention is found in the steps of establishing the slope of the blade leading edge which maintains the air velocity component normal thereto below the sonic or the critical value at the desired rate of blade rotation, optimizing the location of the point of sweep reversal and stacking the blade profiles so as to minimize the blade bending stresses.

The above and other related objects and features of the invention will be apparent from a reading of the following description of the disclosure, with reference to the accompanying drawings and the novelty thereof pointed out in the appended claims.

In the drawings:

FIG. 1 is a simplified longitudinal half section of the fan component of a turbofan engine;

FIGS. 2 and 3 diagramatically illustrate air flow relative to a blade at the hub and tip sections and to an angled blade leading edge;

FIG. 8 is an elevation of the blade of FIG. 4, in an untwisted condition.

FIG. 1 illustrates the fan section of a turbofan engine wherein the blades of the present invention find particular utility.

Figure 4:
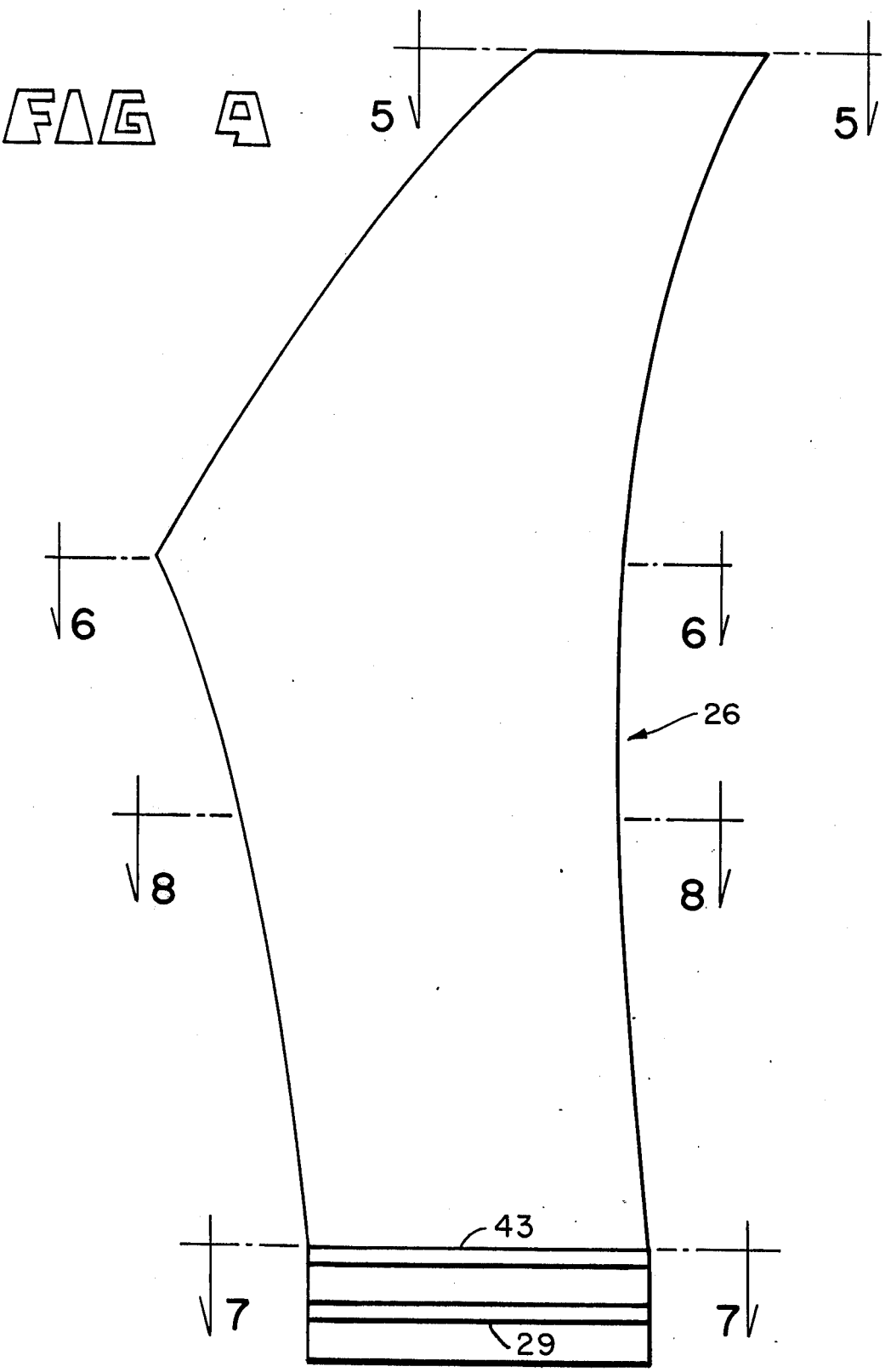
FIG. 4 is a side elevation of the improved blade of the present invention, with the hub portion simplified.

The annular engine inlet, indicated at 20, is defined by an outer cowl 22 and a central spinner 24. Air entering the inlet 20 is pressurized by fan blades 26 projecting radially from a rotor 28. The blades are mounted on the rotor 28 by roots, or tangs, 29, which are restrained in appropriate guides formed in the rotor. Downstream of the blades 26 the pressurized air is split by the leading edge of an engine housing, or nacelle 30.

The outer portion of the pressurized air stream passes through a cascade of stator vanes 32 and then is discharged through an annular nozzle 34 defined by the downstream end of the cowl 22 and the nacelle 30. The inner portion of the pressurized air stream is directed through an inlet 36 to the gas turbine engine, or gas generator.

The gas turbine engine may be of conventional design, comprising a compressor for further pressurizing the air and a combustor in which the pressurized air supports combustion of fuel in the generation of a hot gas stream. A portion of the gas energy is extracted by a turbine to drive the gas generator compressor. A second power turbine extracts a further portion through a nozzle to provide additional propulsive thrust.

The power turbine has a forwardly extending output shaft 38 on which the spinner 24 and rotor 28 are mounted and rotated thereby. The output shaft 38 is journalled, in part, on a frame element 40. It will also be seen that the cowl 22 is structurally connected to the nacelle 30 by angularly spaced struts 42.

The described fan section comprises what may be referenced as a low pressure compressor, or fan, the latter term being used in the following description.

In high bypass ratio engines the fan rotor rotates at a rate such that the air velocity relative to the upper portion of the blades is supersonic and forward propagating shock waves are generated along the leading edges of conventional blades. These shock waves generate the "multiple pure tone noise" referred to above. The blade of the present invention minimizes this objectionable noise.

Before describing this improved blade, a brief reference will be made to some basic considerations of blade design, with reference to FIG. 2. Broken line $a$ indicates the rotor axis and arrow $b$, the sense of rotation of a blade whose hub profile is shown by a solid outline. Vector $V_x$ represents the rotational velocity of the leading edge of the blade at the hub profile radius. $V_y$ represents the absolute velocity of air at the leading edge. Vector $V_r$ represents the relative velocity between the air and the blade leading edge at that radius. Typical relative Mach number values are $M_r = 0.8$ at the hub, and $M_r = 1.5$ at the tip sections.

At the hub, the chord line $c$ of the blade is set at an angle $t$ relative to the axis $a$ to provide the desired angle of attack of the vector $V_r$ on the leading edge. The vector $V_y$ remains essentially constant across the width of the fan inlet, while the vector $V_x$ increases in a radially outward direction. Thus, the setting angle $t$ generally increases in that direction. This is illustrated by the broken outline of the blade tip profile. At this point it will be pointed out that the term "profile" denotes a blade cross section essentially perpendicular to the radius, while "blade element" denotes blade portion comprised between two closely spaced cross sections.

A fundamental principle in attaining the ends of the present invention is illustrated in FIG. 3. The vector $V_r$ is shown impinging on a radially extending leading edge $d$, normal to air flow direction. The angled broken line leading edge $d'$ shown in the same figure demonstrates that the velocity component $V_i$, normal to the inclined blade edge is substantially smaller than the relative flow velocity $V_r$.

The blades 26 incorporate this principle, as will be evident from the following description of FIGS. 4–8. FIGS. 4–7 show the blade 26 in its actual twisted configuration. FIG. 8 is for illustrative purposes and shows the blade untwisted and the vectors $V_r$ rotated around a radial axis so that the leading edge and the rotated vectors $V_r$ are in a common plane.

From FIG. 8 it can be seen that the leading edge 44 of the blade 26 is swept forwardly from its hub end out to a point 46 located inwardly from the tip end 48 of the blade. From the point 46 the leading edge 44 is swept rearwardly to the tip end 48. The forwardly and rearwardly swept portions of the leading edge follow a curve which has a progressively decreasing slope angle $\theta$ with respect to the direction of air flow, as indicated by the vector $V_r$.

It will be seen that the velocity components $V_{i1}$ and $V_{i2}$ normal to the leading edge 44, at points inwardly and outwardly of sweep reversal point 46, are substantially smaller than the corresponding velocities $V_{r1}$ and $V_{r2}$.

The slope of the leading edge is such that the component $V_i$ is maintained below the sonic velocity at which objectionable forward propagating noise would be generated. The slope angle $\theta$ thus is progressively decreased, as will be apparent from the angles $\theta_1$ and $\theta_2$.

Further, depending on the design requirements of a given blade the slope of the leading edge 44 may be decreased to maintain the normal velocity component $V_i$ below the critical value along a portion or the entire length of the leading edge.

At the design speed of blade 26 the velocity $V_r$ at the hub profile is in excess of the critical or the sonic value and the leading edge is swept from the point outwardly to the tip end of the blade. In some cases the relative air velocity at the hub profile will be below the sonic velocity or the critical velocity, or both. In such case sweeping of the leading edge would not necessarily begin until the radially outward point on the leading edge where the critical or sonic velocity is attained.

Blade profiles, although of an airfoil shape, can vary widely according to the energy to be imparted to the air stream and other parameters well known to those skilled in the art. It is preferred that the profiles of the blade 26 be established in accordance with such known design principles consistent with the teachings herein.

In one sense the present invention involves shifting the tip end blade profile rearwardly and then forming the leading edge, as above described. Broken line e in FIG. 8 represents the leading edge of a blade with conventional profiles plotted from the trailing edge 50. It will be seen that the present invention involves increasing the chord lengths of the blade profiles, resulting in the addition of a triangular portion in advance of the line e.

Figure 5:
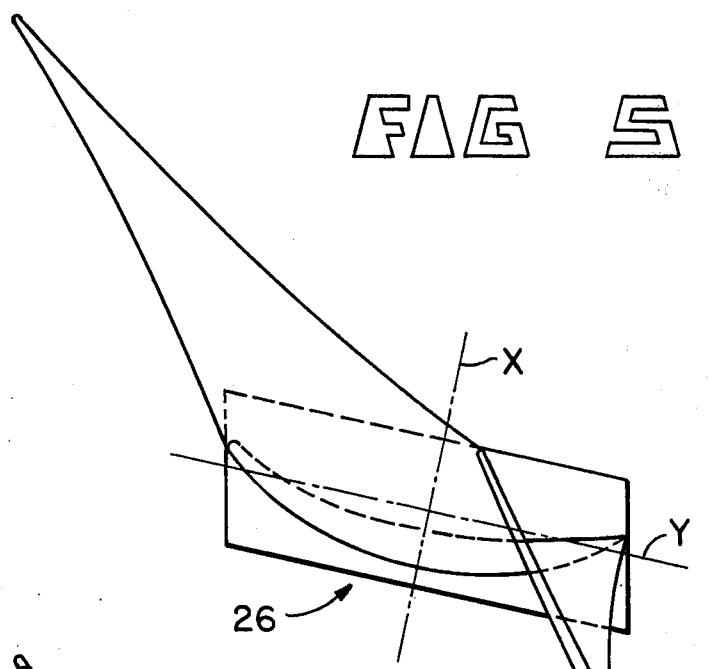
FIG. 5 is a tip end view taken on line 5—5 in FIG. 4.
Figure 6:
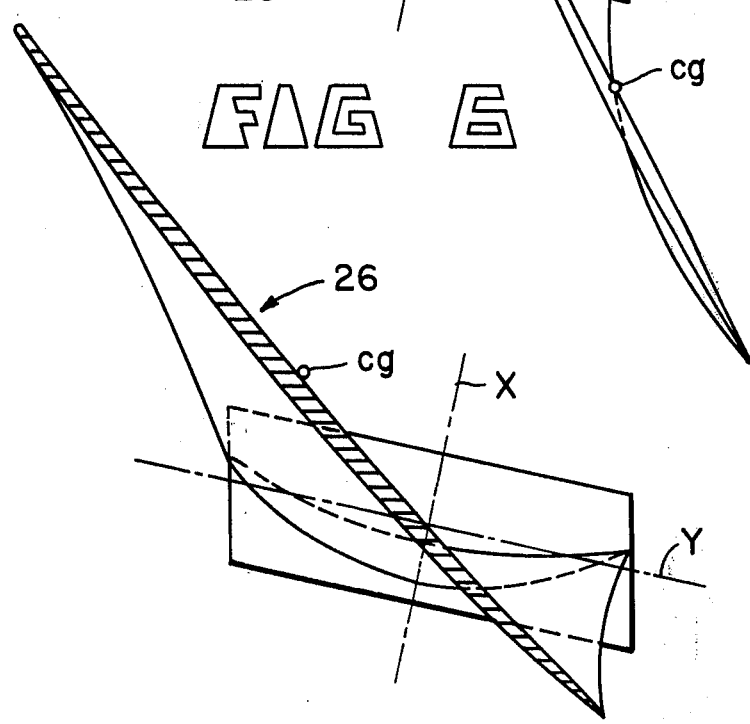
FIG. 6 is a section taken on line 6—6 in FIG. 4.
Figure 7:
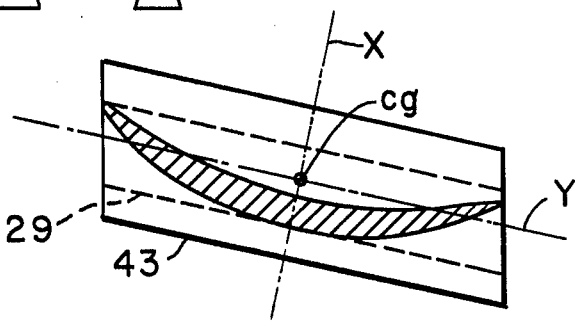
FIG. 7 is a section, at the hub profile, taken on line 7—7 in FIG. 4.

From FIGS. 5–7 it can be seen that the setting angle t increases and the camber decreases from the hub to the tip end of the blade in accordance with the basic requirements of a conventional design.

In conventional blades the centers of gravity of the blade profiles may be stacked on a radius extending through the center of gravity of the hub section, so that there are no centrifugal bending moments induced in the blade. This same principle could theoretically be employed with the present blade by reversely sweeping the trailing edge to maintain the centers of gravity of all blade profiles radially aligned with the center of gravity of the hub section. Such a blade, however, would generally involve unacceptable weight and aerodynamic penalties.

From purely a weight standpoint it would be desirable to use conventional chord lengths from hub to tip. However, to do so would result in unacceptable bending stresses.

To minimize these bending stresses the trailing edge 50 is smoothly curved from the hub to the tip profiles. This means that the centers of gravity of the blade profiles progressively shift in a direction generally opposite to the direction of air flow from the hub section out to the point of sweep reversal. Then from the point of sweep reversal outwardly to the tip section the centers of gravity progressively shift in the same general direction as the direction of air flow. Bearing in mind that the blade is twisted from hub to tip, the centers of gravity are progressively displaced relative to the major and minor axes of inertia, $x$ and $y$, respectively, of the hub section. This is illustrated by the profile centers of gravity $cg$ shown in FIGS. 5–7.

Preferably, the summation of the bending moments of the centrifugal forces of the blade elements is essentially balanced relative to the major and minor axes of inertia of the hub section. Thus, there is little or no added bending stress at the hub section where the centrifugal tensile stresses are greatest. This end is attained by positioning the centers of gravity of the blade profiles so that their radial projections straddle the major and minor axes of the hub section. Thus, it will be seen that the centers of gravity are progressively displaced, from the hub section to the point of sweep reversal, to an extreme position to one side of both the major and the minor axis of inertia, $x$ and $y$. Then, as the centers of gravity are shifted in the opposite direction outwardly of the point of sweep reversal, an extreme position is reached at the tip section where the center of gravity is on the opposite side of the major and minor axis of inertia, $x$ and $y$.

In a further improved configuration the centers of gravity of the blade profiles are positioned so that the summation of the centrifugal moments essentially balances the moment of the aerodynamic blade forces at the hub section.

While it is possible to essentially eliminate bending stresses at the hub section, there will be bending stresses intermediate the hub and tip sections. Generally, these bending stresses will be greatest in the trailing edge region at the point of sweep reversal and this will dictate the minimum profile chord length and thickness at that location.

In determining the configuration of the blade 26 the first step is to define the hub and tip section profiles according to conventional aerodynamic design procedures. The point of sweep reversal is then tentatively selected and the slope of the leading edge line is established so as to maintain the component of the air velocity normal thereto below the sonic or critical value over the entire span of the blade. This can be done in many ways, since the leading edge line in principle must only satisfy the condition that its tangent at every point lie on a cone whose axis coincides with the relative velocity direction at that point, whose vertex is at that point and whose aperture is such that the projection of the relative velocity perpendicular to the cone surface is smaller than the sonic or critical velocity. For the initial attempt the leading edge line is selected so that the straddling condition of the centers of gravity of the tip and the sweep reversal profiles relative to the major and the minor axis of inertia of the hub section is qualitatively satisfied. A trailing edge line is then established to define intermediate profiles with minimum chord length and adequate thickness. It is then possible to determine the centrifugal force of the blade and its bending moments relative to the major and minor axes of inertia of the hub section. This process is then iterated, i.e. the location of the point of sweep reversal, the position of the centers of gravity of the profiles and the trailing edge line are modified until those moments are minimized or essentially balance the aerodynamic moment at the hub section.

If, after optimization of the point of sweep reversal, as above described, there remains a substantial imbalance of the centrifugal moment relative to any other blade section, then the iterative process of positioning the centers of gravity of the profiles must be pursued until proper straddling of their radial projections relative to the minor axis of inertia, $x$, of that section is achieved, while preserving the balanced conditions at the hub section. This in general will require additional shifts of the centers of gravity of profiles located below as well as above the intermediate section involved.

During those final iterations, the profile chord lengths and thicknesses may be adjusted at particular locations to achieve a complete design optimization.

The described blade and the method of determining its configuration essentially eliminates standing shock waves on the leading edge and the objectionable noise generated thereby. Further, there is a minimum increase in weight to attain this primary end, while at the same time stresses are maintained at safe levels when operating at the peripheral speeds of advanced high bypass ratio fans.

It is to be emphasized that the foregoing description of the blade 26 illustrates only a particular design example and the basic method and steps to be followed in the design of a blade which essentially eliminates standing shock waves along its leading edge with minimum additional weight and stresses.

Variations from the embodiments and the method herein described will occur to those skilled in the art within the spirit and scope of the present invention which are to be limited solely by the following claims.

Having thus described the invention what is claimed as novel and desired to be secured by Letters Patent of the United States is:

1. In an axial flow compressor:
   a rotor having a circumferential row of radially projecting blades, each blade having means at its hub end for attaching it to the rotor,
   each blade being in the form of an airfoil having a progressively decreasing camber and progressively increasing angle of twist from its hub end to its tip end,
   said rotor having a rate of rotation at which at least an outer portion of the blade has a velocity, relative to the air flow therepast, which is at a sonic value or greater, said relative velocity being sufficient to generate a shock wave on the leading blade edge disposed normal to the direction of relative airflow, characterized in that
   the profiles of each blade at the inner, or hub end, and at the outer or tip end of said outer portion are of conventional length,
   the leading edge of said outer portion is swept forwardly from its hub end on a curve having a progressively decreasing slope relative to the direction of air flow, outwardly to a point of sweep reversal spaced inwardly from the tip end of the blade and, from said point of reversal, the leading edge is swept rearwardly to the tip end of the blade on a curve also having a progressively decreasing slope relative to the direction of air flow therepast, said slope at all points along the forwardly and rearwardly swepted portions of the leading edge being such that the flow velocity component normal thereto remains below a sonic value, and
   the trailing edge of said outer portion of the blade is smoothly curved in a rearward direction from its hub end to its tip end, whereby the chord length of the blade profiles progressively become greater than conventional lengths outwardly to said point of sweep reversal and then the profile chord lengths progressively decrease to the conventional length profile at the tip end of the blade, and
   further characterized in that
   the point of curvature reversal is so disposed that the centers of gravity of the blades profiles progressively shift in one direction relative to the major and minor axis of inertia of the attachment means from the hub end of said outer portion to said point of sweep reversal and then shift in the opposite direction, relative to said axis of inertia, from the point of sweep reversal to the tip end, a distance such that a summation of the centrifugal bending moments is essentially balanced relative to the attachment means due to the straddling of the axis of inertia by the centers of gravity of the blade profiles.

* * * * *